United States Patent
Patel et al.

(10) Patent No.: US 11,379,269 B2
(45) Date of Patent: Jul. 5, 2022

(54) LOAD BALANCING BASED ON UTILIZATION PERCENTAGE OF CPU CORES

(71) Applicant: International Business Machines Corporation, Armonk, NY (US)

(72) Inventors: Kushal S. Patel, Pune (IN); Sarvesh S. Patel, Pune (IN); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/003,344

(22) Filed: Aug. 26, 2020

(65) Prior Publication Data

US 2022/0066822 A1    Mar. 3, 2022

(51) Int. Cl.
*G06F 9/50*     (2006.01)
*G06F 13/16*    (2006.01)
(Continued)

(52) U.S. Cl.
CPC .......... *G06F 9/505* (2013.01); *G06F 11/3024* (2013.01); *G06F 11/3034* (2013.01);
(Continued)

(58) Field of Classification Search
CPC ............... G06F 3/0653; G06F 11/3055; G06F 11/3051; G06F 11/3041; G06F 11/3003;
(Continued)

(56) References Cited

U.S. PATENT DOCUMENTS 8,595,389 B2 * 11/2013 Davis .................. G06F 12/0897
710/18
9,058,217 B2 * 6/2015 Ash ........................... G06F 9/46
(Continued)

FOREIGN PATENT DOCUMENTS

CN    101013387 A    8/2007
CN    107515781 A    12/2017
(Continued)

OTHER PUBLICATIONS

Authors, et al. Disclosed Anonymously, "Responsibility-based I/O Prioritization in Port-Sharing Storage Systems", An IP.com Prior Art Database Technical Disclosure, IP.com No. IPCOM000259695D, IP.com Electronic Publication Date: Sep. 8, 2019, 6 Pages.
(Continued)

*Primary Examiner* — Raymond N Phan
(74) *Attorney, Agent, or Firm* — Alexander G. Jochym

(57) ABSTRACT

In an approach to storage level load balancing, the load level of a storage system is monitored, where the load level is a utilization percentage of a plurality of CPU cores in the storage system. An overload condition is detected based on the utilization percentage of one or more CPU cores exceeding a threshold, where the overload condition is caused by an overlap of one or more I/O queues from multiple host computers accessing a single CPU core. Responsive to detecting the overload condition, a new I/O queue is selected on a second CPU core, where the second CPU core has a utilization percentage less than a second threshold. A recommendation is sent to a host computer, where the recommendation is to move I/O traffic from the first CPU core to the new I/O queue on the second CPU core to rebalance the load level of the storage system.

23 Claims, 7 Drawing Sheets

(51) Int. Cl.
*G06F 11/30* (2006.01)
*G06F 11/34* (2006.01)

(52) U.S. Cl.
CPC ...... *G06F 11/3495* (2013.01); *G06F 13/1668* (2013.01); *G06F 2209/503* (2013.01); *G06F 2209/5013* (2013.01)

(58) Field of Classification Search
CPC ....... G06F 2209/503; G06F 2209/5013; G06F 1/3024; G06F 9/505
See application file for complete search history.

(56) References Cited

U.S. PATENT DOCUMENTS

| | | | |
|---|---|---|---|
| 10,439,878 B1 | 10/2019 | Tah | |
| 2011/0107344 A1* | 5/2011 | Kim | G06F 9/5088 718/105 |
| 2012/1800611 | 7/2012 | Rao | |
| 2017/1773881 | 6/2017 | Wen-Sheng | |
| 2018/0157515 A1* | 6/2018 | Malloy | H04L 47/627 |
| 2018/0331960 A1* | 11/2018 | Browne | H04L 47/2441 |
| 2019/0332276 A1 | 10/2019 | Gupta | |
| 2019/0334982 A1 | 10/2019 | Mallick | |
| 2021/0075730 A1* | 3/2021 | Palermo | H04L 47/6255 |
| 2021/0255903 A1* | 8/2021 | Wang | G06F 9/546 |
| 2021/0263677 A1* | 8/2021 | Patel | G06F 9/505 |

FOREIGN PATENT DOCUMENTS

| | | |
|---|---|---|
| CN | 109766180 A | 5/2019 |
| WO | 20131192261 W | 8/2013 |

OTHER PUBLICATIONS

Patent Cooperation Treaty PCT Notification of Transmittal of the International Search Report and the Written Opinion of the International Searching Authority, or the Declaration, International application No. PCT/IB2021/057438, International Filing Date Aug. 12, 2021, dated Dec. 30, 2021, 10 Pgs.

* cited by examiner

LOAD BALANCING BASED ON UTILIZATION PERCENTAGE OF CPU CORES

BACKGROUND

The present invention relates generally to the field of computer storage, and more particularly to storage level load balancing.

Non-Volatile Memory Express (NVMe™) is an optimized, high-performance scalable host controller interface designed to address the needs computer storage systems that utilize solid-state storage based on the Peripheral Component Interconnect Express® (PCIe®) interface. Designed from the ground up for non-volatile memory technologies, NVMe is designed to provide efficient access to storage devices built with non-volatile memory, from current NAND flash technology to future, higher-performing, persistent memory technologies.

The NVMe protocol capitalizes on parallel, low latency data paths to the underlying media, similar to high performance processor architectures. This offers significantly higher performance and lower latencies compared to legacy storage interfaces, such as the Serial Attached SCSI (SAS) and Serial Advanced Technology Attachment (SATA) protocols. NVMe can support up to 65,535 Input/Output (I/O) queues, with each queue having 65,535 entries. Legacy SAS and SATA interfaces can only support single queues, with each SAS queue having 254 entries and each SATA queue having only 32 entries. The NVMe host software can create queues, up to the maximum allowed by the NVMe controller, as per system configuration and expected workload. NVMe supports scatter/gather I/Os, minimizing CPU overhead on data transfers, and even provides the capability of changing their priority based on workload requirements.

NVMe over Fabrics (NVMe-oF) is a network protocol used to communicate between a host and a storage system over a network (aka fabric). NVMe-oF defines a common architecture that supports a range of storage networking fabrics for NVMe block storage protocol over a storage networking fabric. This includes enabling a front-side interface into the storage system, scaling out to large numbers of NVMe devices, and extending the distance over which NVMe devices and NVMe subsystems can be accessed.

SUMMARY

Embodiments of the present invention include a computer-implemented method for storage level load balancing. In a first embodiment, the load level of a storage system is monitored, where the load level is a utilization percentage of a plurality of CPU cores in the storage system. An overload condition is detected based on the utilization percentage of one or more CPU cores exceeds a threshold, where the overload condition is caused by an overlap of one or more I/O queues from multiple host computers accessing a single CPU core in the storage system. Responsive to detecting the overload condition, a new I/O queue (IOQ) is selected on a second CPU core in the storage system, where the second CPU core has a utilization percentage less than a second threshold. A recommendation is sent to a host computer, where the recommendation is to move I/O traffic from the first CPU core to the new I/O queue on the second CPU core to rebalance the load level of the storage system.

Embodiments of the present invention include a computer-implemented method for storage level load balancing. In a second embodiment, responsive to receiving a command from a host computer to establish an I/O queue pair, processor and memory resources are allocated in a storage system, where the storage system implements the Non-Volatile Memory Express over Fabrics (NVMe-oF) architecture. An overload condition is detected on a CPU core in the storage system, where the overload condition is an overlap of a plurality of host computers using a same I/O queue pair. Responsive to detecting the overload condition, a recommendation is sent to a host computer, where the recommendation is to move I/O traffic from the first CPU core to a new I/O queue on a second CPU core to rebalance a load level of the storage system.

DETAILED DESCRIPTION

Figure 1:
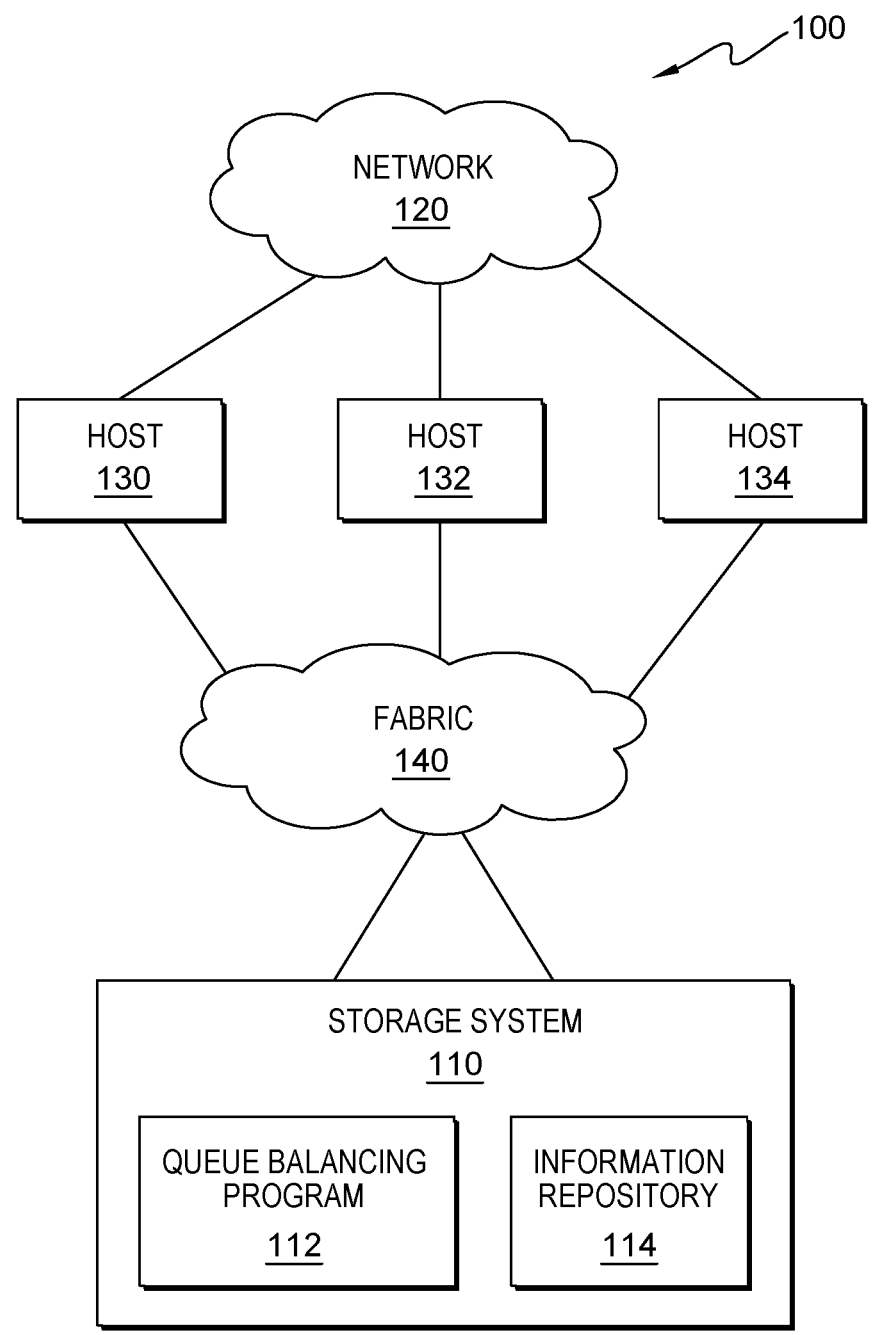
FIG. 1 is a functional block diagram illustrating a distributed data processing environment, in accordance with an embodiment of the present invention.

With the explosive growth in the amount and usage of data in modern data processing systems, new methods are needed to increase the throughput and reduce the latency of data transfer between the host and storage in modern systems. In a typical system, there are multiple transport channels and protocols co-existing in one storage system, which may include NVMe Remote Direct Memory Access (NVMe-RDMA), NVMe over Fiber Channel (NVMe-FC), Fiber Channel-to-Small Computer System Interface (FC-SCSI), Fiber Channel over Ethernet (FCoE), Internet Small Computer Systems Interface (iSCSI), etc.

NVMe is a storage protocol that is designed for faster data transfer between servers, storage devices and flash controllers that typically use the PCIe bus as the transport mechanism. The NVMe specification provides a register interface and a command set that enables high performance I/O. NVMe is an alternative to the traditional Small Computer System Interface (SCSI) standards (and other standards like SAS, SATA, etc.) for data transmission between hosts and storage systems. One of the major advantages of NVMe-based PCIe flash has over SAS and SATA-based SSDs is reduced latency of access in the host software stack, leading to higher Input/Output Operations Per Second (IOPS) and lower CPU utilization.

NVMe supports parallel I/O processing with multicore processors that results in faster I/O dispatching which leads to a reduction in I/O latency. Since multiple CPU cores are processing I/O requests simultaneously, system performance increases due to optimal utilization of CPU resources. Additionally, NVMe is designed to use fewer CPU instructions per I/O. NVMe also supports 64,000 commands in a single message queue and a maximum of 65,535 I/O queues.

NVMe over Fabrics (NVMe-oF) is an extension to local PCIe NVMe that allows the benefits of high-performance and low-latency that NVMe provides, but across network fabrics instead of a local connection. Servers and storage devices can be connected over an Ethernet network or Fibre Channel (FC), which both support NVMe commands over fabric, and extend the advantages of NVMe protocol to interconnected system components. The stated design goal for NVMe-oF was to add no more than 10 microseconds of latency for communication between an NVMe host computer and network-connected NVMe storage devices, in addition to the latency associated with accessing the PCIe NVMe storage device.

NVMe-oF supports multiple I/O queues for regular I/O operation from host to storage systems. A maximum of 65,535 queues are supported by NVMe with up to 65,535 entries in each queue. It is the responsibility of the host driver to create queues once the connection is established. Once the host is connected to the target system, a special purpose queue is created called the Admin Queue. As the name suggests, the Admin Queue is used to transfer control commands from an initiator to the target device. Once the Admin Queue is created, it is used by a host to create I/O queues based on system requirements. The host may establish multiple I/O queues to a single controller with the same NQN (NVMe Qualified Name, which is used to identify the remote NVMe storage target) and have multiple namespaces (or volumes) mapped to it. Once I/O queues are established, I/O commands are submitted to the I/O Submission Queue (SQ) and I/O responses are collected from the Completion Queue (CQ). These I/O queues can be added or removed using control instructions sent via the Admin Queue for that session.

When a command is received for I/O queue creation, the target device performs initial system checks for maximum supported queues and other relevant fields, creates an I/O queue, and assigns the I/O queue to a CPU core on the storage controller. Next, the target device sends a response to the queue creation request via the Admin Completion queue. Each I/O queue is assigned to a different CPU core on the storage controller. This allows parallelism and boosts throughput of the system. Core assignment logic is implemented at the target storage controller and I/O queues to CPU core mapping is performed based on a predefined policy at the storage controller.

The problem in the current art is performance degradation due to queue overlap. NVMe can support approximately 65,535 queues that can be assigned to different CPU cores to achieve parallelism. When a host issues a command to establish an I/O queue pair with the storage system, the storage system allocates processor resources and memory resources to the I/O queue pair. Consider, for example, a case where two or more hosts are establishing connections to a common NVMe target. It is likely that I/O queues created by the multiple hosts will start overlapping on individual CPU cores, i.e., Host 'A' primary I/O queues on Core 1 can overlap with Host 'B' primary I/O queues on Core 1. In such scenarios, I/O workloads transmitted over NVMe queues from I/O queue pair from both hosts are served by a single core at the storage controller. This reduces parallelism at the storage controller end and affects host application I/O performance. In the current state of the art, there is no means to tie CPU core assignment to expected workloads and this can lead to significant I/O load imbalance across the CPU cores available on the storage controller nodes. Since each CPU core is shared across the multiple I/O queues, there is no means to detect workload imbalance due to overlapping queues from one or more hosts or to notify the servers of the workload imbalance. In the case where multiple hosts are connected to the storage target via NVMe queues, it is probable that some of the CPU cores are overloaded and some are underloaded because of dissimilar host I/O workload. In addition, there is no mechanism by which the storage system can predict how much load will be generated by each queue at the time of I/O queue creation. At the host multipathing driver, the host will use a certain I/O queue as a primary queue. In the case where multiple hosts have primary queues attached to the same CPU core, that CPU core gets overloaded and the applications accessing the data will experience increased I/O latency, and therefore will not get the benefits of parallelism.

As a result of I/O queue overlaps, IOPS can decrease due to imbalanced load across CPU cores. In the case where the host is performing a small I/O intensive workload, the severity of this overhead due to overlapped queues becomes worse and may lead to application slowdown during peak workload along with unexpected I/O latency issues. This also creates performance issues at the storage controller, because imbalanced CPU cores across the storage controller system adds additional burden on some CPU cores while other CPU cores are free, thus reducing parallel processing and increasing overall delay and latency.

In various embodiments, the present invention solves this problem by detecting overlapping I/O queues in CPU core assignments within an NVMe storage controller, and rebalancing the assignments of the I/O queues to the CPU cores. In an embodiment, the queue balancing program monitors the queues established on all available CPU cores, the workload, and the CPU core availability. Once the queue overlap situation is encountered, the queue balancing program will determine the CPU workload and the load imbalance. The queue balancing program identifies the I/O queues connected to the CPU cores and analyzes the I/O queues for the IOPS workloads with high bandwidth utilization. Since the IOPS workloads are CPU sensitive, the queue balancing program gathers this information and maps the CPU consumption per I/O queue attached to the overloaded CPU core. In an embodiment, the queue balancing program traverses all the I/O queues that are created from the same hosts and analyzes their workloads as well.

In an embodiment, the queue balancing program determines which I/O queue workload can be increased to gain the better performance based on the workload information gathered. The queue balancing program accomplishes this by performing symmetric workload balancing of the I/O queue workloads on the storage system.

In an embodiment, once the queue balancing program makes the new I/O workload transferring decisions, the information is sent as a signal to the administrative control unit of the NVMe controller and an asynchronous notification of the queue overlap situation to the host. This Advanced Error Reporting (AER) message contains the I/O queue ID (IOQ_ID) to which the storage system is expecting to move traffic to balance the CPU workload.

Once the signal is sent to the host, the host NVMe driver will decide whether to continue with the current I/O sending policy or to adopt the suggestion from the queue balancing program for prioritizing a certain IOQ. If the host decides to adopt the suggestion from the queue balancing program, then the IOQ pathing policies are tuned by the NVMe driver at the host side. In some instances, if the hosts can tolerate the performance degradation, or the host can tolerate the total decrease in IOPs, or if the host does not want to change the IOQ policy for any other reason, then the suggestion is rejected, and a signal is sent to the queue balancing program notifying it of the rejection. In an embodiment, once the queue balancing program receives the rejection signal, the queue balancing program sends an AER message to another host to shift its I/O workload off the overloaded CPU core. In this way, the queue balancing program and the hosts will both be parties to the decision, and workload balancing will be accomplished gracefully by signaling the second host.

The advantages of the present invention include reduced queue overlap bottlenecks, better performance, increase in IOPS, avoiding re-creation of IOQs, and improved load balancing across the CPU cores.

The present invention reduces queue overlap bottlenecks since the host IOQ preference is changed, thereby reducing or eliminating CPU core imbalances.

The present invention results in better performance because in a queue overlap situation when hosts are performing I/Os simultaneously, the performance will decrease as the core services each queue one at a time. But when two queues belong to different hosts, the present invention rebalances the I/O queues to avoid an overall performance degradation.

The present invention results in an increase in IOPs since the queue overlap situation is avoided, and therefore the host I/O turn-around time gets reduced which increases the overall IOPS.

The present invention avoids the re-creation of IOQs because it does not disconnect the IOQs from the storage system or the host, and only instructs the host NVMe driver to change the target on the fly, thereby balancing the storage level workload and creating a performance gain transparently.

The present invention results in improved load balancing across the CPU cores, because greater equilibrium is achieved for the load across all the CPU cores in the storage system and therefore the storage system is more balanced.

FIG. 1 is a functional block diagram illustrating a distributed data processing environment, generally designated 100, suitable for operation of queue balancing program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In various embodiments, distributed data processing environment 100 includes a plurality of host computers. In the embodiment depicted in FIG. 1, distributed data processing environment 100 includes host 130, host 132, and host 134, all connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between host 130, host 132, host 134, and other computing devices (not shown) within distributed data processing environment 100.

In various embodiments, host 130, host 132, and host 134 can each be a standalone computing device, a management server, a web server, a mobile computing device, or any other electronic device or computing system capable of receiving, sending, and processing data. In an embodiment, host 130, host 132, and host 134 can each be a personal computer, a desktop computer, a laptop computer, a netbook computer, a tablet computer, a smart phone, or any programmable electronic device capable of communicating with other computing devices (not shown) within distributed data processing environment 100 via network 120. In another embodiment, host 130, host 132, and host 134 can each represent a server computing system utilizing multiple computers as a server system, such as in a cloud computing environment. In yet another embodiment, host 130, host 132, and host 134 each represent a computing system utilizing clustered computers and components (e.g., database server computers, application server computers, etc.) that act as a single pool of seamless resources when accessed within distributed data processing environment 100.

In various embodiments, distributed data processing environment 100 also includes storage system 110, connected to host 130, host 132, and host 134 via fabric 140. Fabric 140 can be, for example, an Ethernet fabric, a Fibre Channel fabric, Fibre Channel over Ethernet (FCoE), or an InfiniBand® fabric. In another embodiment, fabric 140 can include any of the RDMA technologies, including InfiniBand, RDMA over Converged Ethernet (RoCE) and iWARP. In other embodiments, fabric 140 can be any fabric capable of interfacing a host to a storage system as would be known to a person of skill in the art.

In various embodiments, storage system 110 can be a standalone computing device, a management server, a web server, a mobile computing device, or any other electronic device or computing system capable of receiving, sending, and processing data. In some embodiments, storage system 110 can connect to network 120 via fabric 140.

In an embodiment, storage system 110 includes queue balancing program 112. In an embodiment, queue balancing program 112 is a program, application, or subprogram of a larger program for intelligently choosing transport channels across protocols by drive type.

In an embodiment, storage system 110 includes information repository 114. In an embodiment, information repository 114 may be managed by queue balancing program 112. In an alternate embodiment, information repository 114 may be managed by the operating system of storage system 110, alone, or together with, queue balancing program 112. Information repository 114 is a data repository that can store, gather, compare, and/or combine information. In some embodiments, information repository 114 is located externally to storage system 110 and accessed through a communication network, such as fabric 140. In some embodiments, information repository 114 is stored on storage system 110. In some embodiments, information repository 114 may reside on another computing device (not shown), provided that information repository 114 is accessible by storage system 110. Information repository 114 may include transport channel and protocol data, protocol class data, drive type and drive tier data, link connection data, transport channel tables, raw data to be transferred between the host initiator and target storage system, other data that is received by queue balancing program 112 from one or more sources, and data that is created by queue balancing program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), SATA drives, solid-state drives (SSD), or random-access memory (RAM). Similarly, information repository 114 may be implemented with any suitable storage architecture known in the art, such as a relational database, an object-oriented database, or one or more tables.

Figure 2:
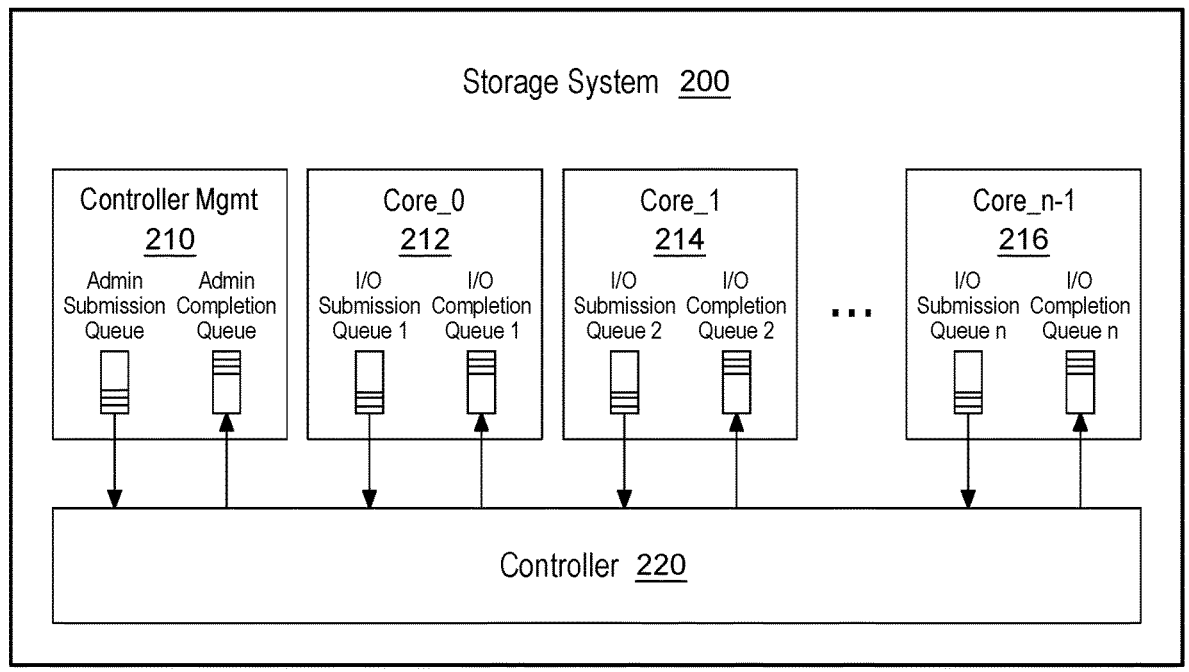
FIG. 2 is an example of NVMe CPU core to queue mapping for a storage system, on a computing device within the distributed data processing environment of FIG. 1, for storage level load balancing, in accordance with an embodiment of the present invention.

FIG. 2 is an example of the mapping of I/O queues to CPU cores in a basic NVMe storage system, in accordance with an embodiment of the invention. In one embodiment, storage system 200 is an example of one possible configuration of the queue mapping of storage system 110 from FIG. 1. In an embodiment, the processor in storage system 200 has a controller management core 210. In an embodiment, once the host is connected to the target system, a special purpose queue is created upon association called the Admin Queue. The Admin Queue is used to transfer control commends from initiator to the target device. In an embodiment, the Admin Queue in controller management core 210 consists of an Admin Submission Queue, to submit I/O requests to the I/O queues, and an Admin Completion Queue, to receive the completion messages from the I/O queues.

In a typical storage system, there are one or more CPUs, each CPU having a plurality of CPU cores. In the example illustrated in FIG. 2, the processor in storage system 200 has n cores, depicted here as Core_0 212, Core_1 214, through Core_n−1 216. In some embodiments of the present invention, each CPU core has an I/O Submission Queue, to submit requests to the I/O queues, and an I/O Completion Queue, to receive completion messages from the I/O queues. The example storage system of FIG. 2 also includes controller 220, which is the controller for the storage system in accordance with some embodiments of the present invention.

It should be noted that the example depicted in FIG. 2 shows only a single I/O queue assigned to each CPU core. In a typical embodiment of the present invention, multiple I/O queues are assigned to each CPU core. This more typical embodiment is illustrated below in FIGS. 3a-3c.

Figure 3A:
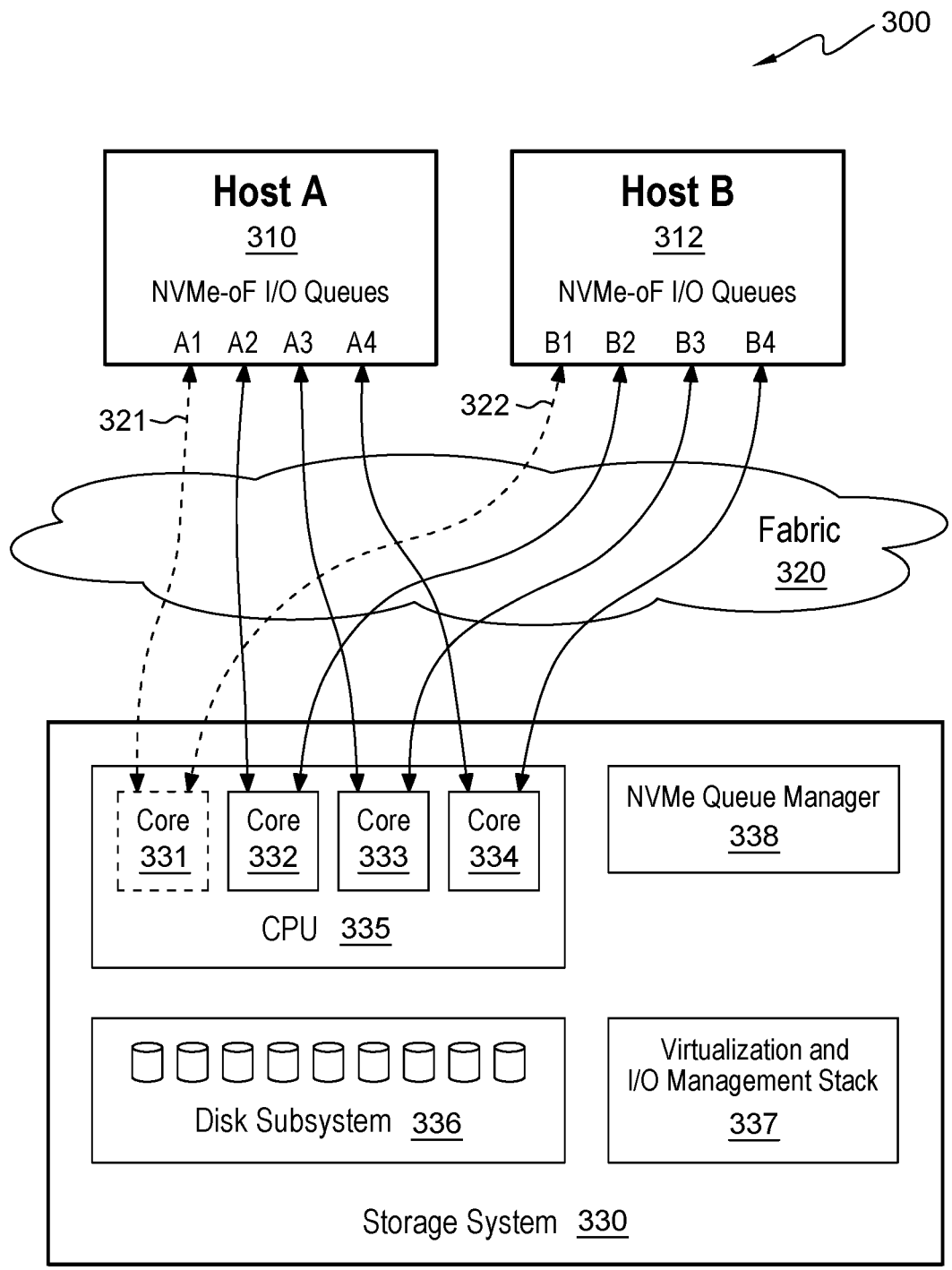
FIG. 3a is an example of an unbalanced storage system, on a computing device within the distributed data processing environment of FIG. 1, for storage level load balancing, in accordance with an embodiment of the present invention.

FIG. 3a is an illustration of a typical storage configuration, generally designated 300, and depicts an example of the problem statement from above. In this example, host A 310 and host B 312 are examples of the hosts (130-134) in distributed data processing environment 100 of FIG. 1. Fabric 320 is the fabric that allows communication between any number of host devices and the storage system. Various communication fabrics that could constitute fabric 320 in various embodiments of the present invention are listed above. Storage system 330 is an example of one possible embodiment of storage system 110 in FIG. 1. Storage system 330 includes disk subsystem 336, virtualization and I/O management stack 337, NVMe queue manager 338, and CPU 335. CPU 335 includes cores 331, 332, 333, and 334, each having two I/O queues attached. In other embodiments, cores 331-334 may have any number of I/O queues attached, up to the maximum supported number of queues as described above. Connections 321 and 322 are examples of the connections between the CPU cores and the NVMe-oF I/O queues in the hosts.

In this example, both Host A and Host B are connected to the storage system and I/O queues are established to all four CPU cores by the hosts. In this example, the A1 and B1 queues have more I/O workload than the other queues, and therefore become overloaded. This creates an overall system imbalance and underutilization of resources.

Figure 3B:
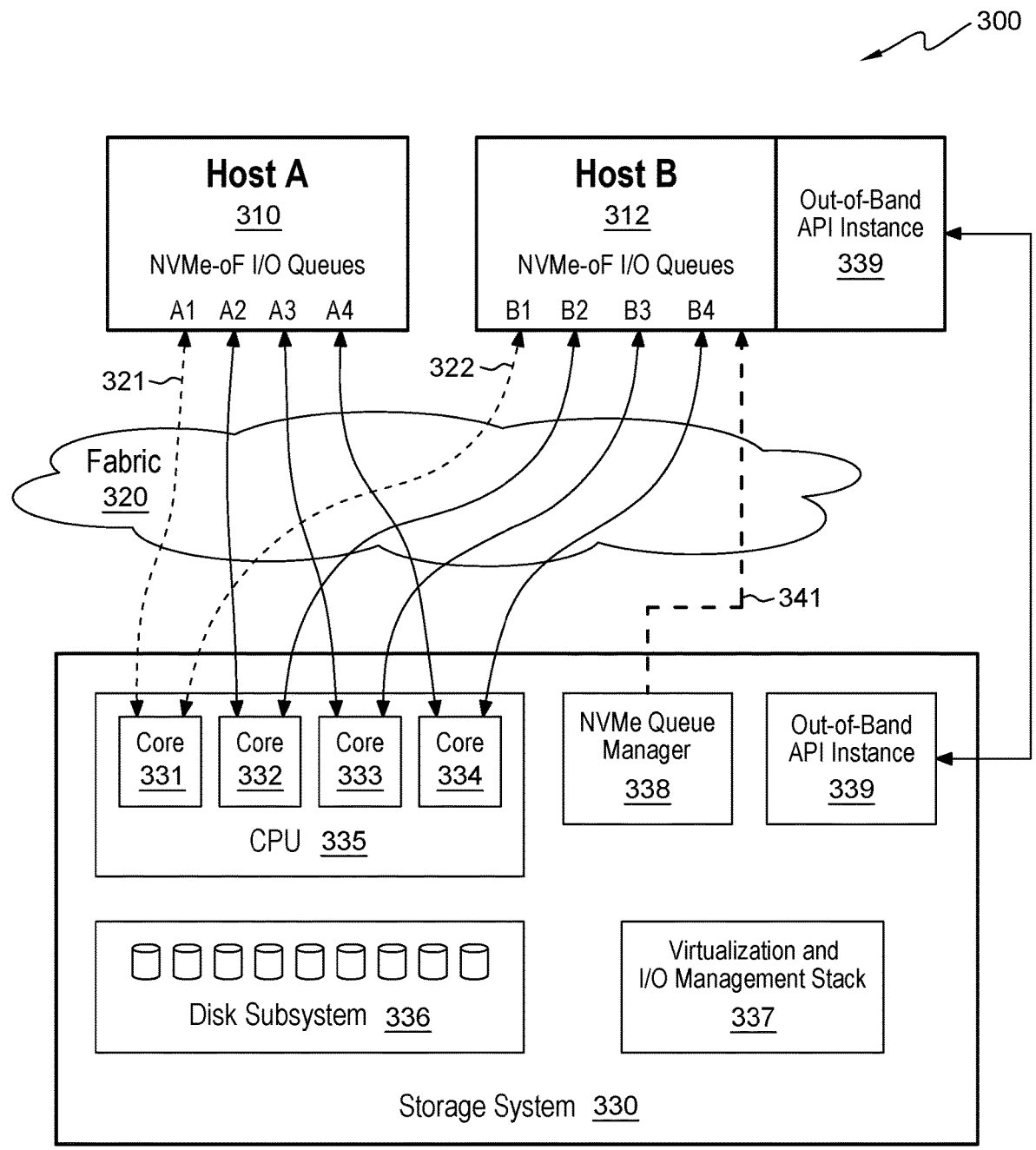
FIG. 3b is an example of a storage system incorporating the present invention, on a computing device within the distributed data processing environment of FIG. 1, for storage level load balancing, in accordance with an embodiment of the present invention.

FIG. 3b depicts an example of the system from FIG. 3a, but with an embodiment of the present invention incorporated. In this example, storage system 330 sends an AER message to host B to signal that core 331 is overloaded and core 332 is underutilized, so that moving traffic from core 331 to core 332 will balance the system and improve performance. In this example, both in-band signaling 341 and out of band signaling 342 are illustrated. In an embodiment, out of band signaling 342 uses Out-of-Band API Instance 339 to communicate with the host. In an embodiment, either in-band or out of band signaling is used. In another embodiment, both in-band and out of band signaling are used.

Figure 3C:
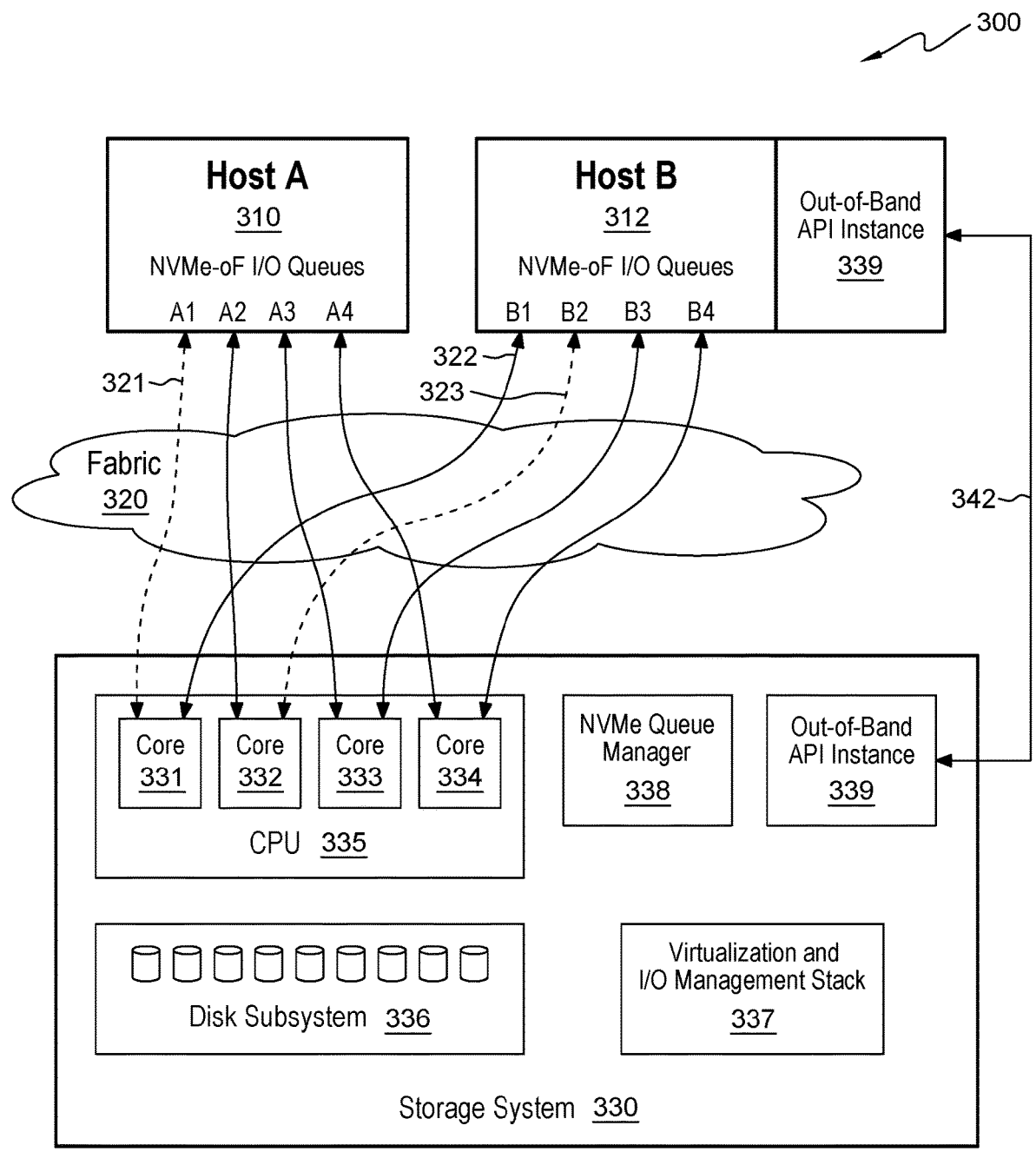
FIG. 3c is an example of a balanced storage system incorporating the present invention, on a computing device within the distributed data processing environment of FIG. 1, for storage level load balancing, in accordance with an embodiment of the present invention.

FIG. 3c depicts an example of the system from FIG. 3a, but with an embodiment of the present invention incorporated. In this example, storage system 330 has moved the traffic that was previously on core 331 for queue B1 (via connection 322) in FIG. 3b to the previously underutilized core 332 and queue B2 (via connection 323), and the utilization of the CPU cores and I/O queues has thereby been rebalanced, increasing throughput and decreasing latency.

Figure 4:
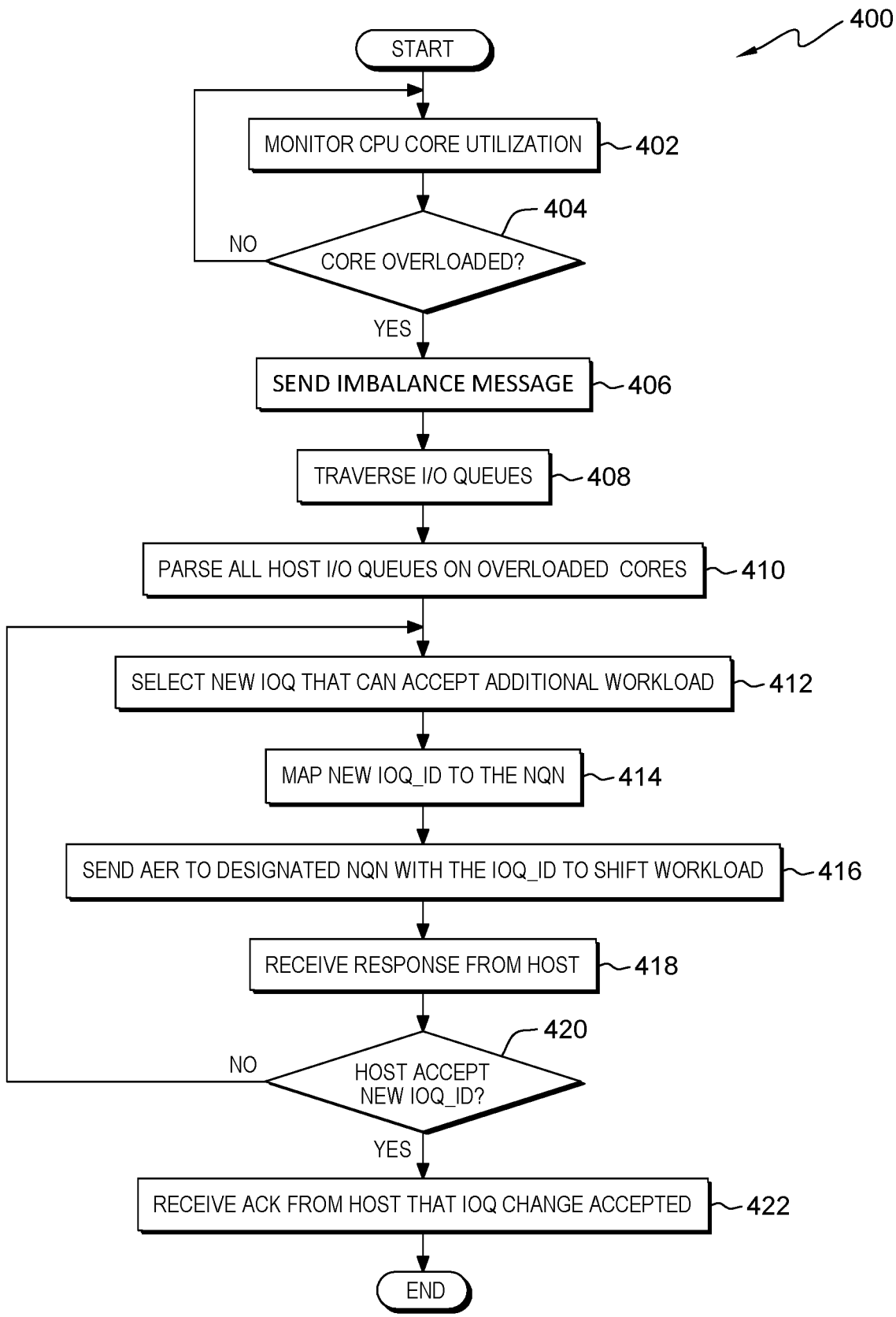
FIG. 4 is a flowchart of the steps of the queue balancing program within the computer system of FIG. 1, in accordance with an embodiment of the present invention.

FIG. 4 is a flow chart diagram of workflow 400 depicting operational steps for queue balancing program 112 for improving workload management in IOQ subsystems. In an embodiment, queue balancing program 112 continuously monitors the CPU core utilization percentage for all the CPU cores in the NVMe system using a daemon that collects the information about the CPU core and checks the CPU core consumption for all the CPU cores available. In an embodiment, queue balancing program 112 determines if one or more CPU cores are detected overloaded and another set of one or more CPU cores are detected underutilized. In an embodiment, if queue balancing program 112 determines that one or more CPU cores are detected overloaded and another set of one or more CPU cores are detected underutilized, then queue balancing program 112 will use the daemon to send a signal to the NVMe controller with an imbalance message. In an embodiment, upon reception of a CPU_IMBALANCE message from the monitoring daemon, queue balancing program 112 will traverse all the I/O queues connected the overloaded CPU core and collect the I/O statistics by accessing the data access maps that are maintained by the storage controller. In an embodiment, queue balancing program 112 parses all the I/O Queues for the host that are part of overloaded CPU cores, and other IOQ information that will be considered for overload balancing is captured. In an embodiment, queue balancing program 112 selects the new IOQ to be recommended for I/O balancing. In an embodiment, queue balancing program 112 uses the IOQ manager to map the new IOQ_ID to the NVMe Qualified Name. In an embodiment, queue balancing program 112 generates the AER message with the suggested new IOQ_ID to the designated NQN to recommend shifting the workload to this IOQ. In an embodiment, queue balancing program 112 receives a response from the host with the new IOQ that was selected in step 412. In an embodiment, queue balancing program 112 determines if the host has accepted the recommendation. In an embodiment, queue balancing program changes the host IOQ preference settings and sends more workload on the Queue with IOQ_ID specified.

In an alternative embodiment, the steps of workflow 400 may be performed by any other program while working with queue balancing program 112. It should be appreciated that embodiments of the present invention provide at least for improving workload management in IOQ subsystems. However, FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

Queue balancing program 112 monitors CPU core utilization (step 402). At step 402, queue balancing program 112 continuously monitors the CPU core utilization percentage for all the CPU cores in the NVMe system using a monitoring daemon that collects the information including the CPU core utilization and I/O queue resource availability and utilization for all the CPU cores available. In an embodiment, queue balancing program 112 monitors the queues established on all available CPU cores, the workload, and the CPU core availability using the monitoring daemon that runs in parallel with the NVMe controller and the queue manger. In an embodiment, queue balancing program 112 collects CPU core utilization data from storage system configuration maps and storage system usage tables.

Queue balancing program 112 determines if the CPU core is overloaded (decision block 404). In an embodiment, queue balancing program 112 determines if one or more CPU cores are in an overloaded condition and another set of one or more CPU cores are underutilized. In an embodiment, the overutilization and underutilization are detected using thresholds that are predetermined. In an embodiment, once the queue overlap situation is encountered (e.g., as illustrated in FIG. 3a, where Host A 310 and Host B 312 are connected to same CPU core), queue balancing program 112 will determine if the CPU workload and the load imbalance exceeds a predetermined threshold. For example, the threshold may be that a CPU core is overutilized if the utilization percentage is greater than 80%. In an embodiment, the predetermined threshold is a system default. In another embodiment, the predetermined threshold is received from a user at runtime.

In another embodiment, queue balancing program 112 determines that one or more CPU cores are in an overloaded condition by measuring the average utilization of each core over a period of time. In this embodiment, if the average utilization of a CPU core exceeds a threshold for a period of time, then queue balancing program 112 determines that the CPU core is overutilized. For example, the threshold may be if the core is over 50% utilization for more than one minute, then the CPU core is overloaded. In an embodiment, the average utilization percentage is a system default. In another embodiment, the average utilization is received from a user at runtime. In an embodiment, the period of time is a system default. In another embodiment, the period of time is received from a user at runtime.

In yet another embodiment, queue balancing program 112 determines that a CPU core is in an overloaded condition the utilization of the core spikes over a short period of time. In this embodiment, if the increase in utilization of a CPU core exceeds a threshold rate of increase within a specified period of time, then queue balancing program 112 determines that the CPU core is overutilized. For example, the threshold may be that if the core utilization increases by 30% within 10 seconds, then the CPU core is overloaded. In an embodiment, the threshold rate of increase is a system default. In another embodiment, the threshold rate of increase is received from a user at runtime. In an embodiment, the specified period of time is a system default. In another embodiment, the specified period of time is received from a user at runtime.

In an embodiment, if the CPU imbalance is confirmed based on the cumulative consumption percentage, then queue balancing program 112 identifies the I/O queues connected to the imbalanced CPU cores and analyzes the I/O queues for the IOPS workloads with high bandwidth utilization. In an embodiment, the threshold for high bandwidth utilization is a system default. In another embodiment, the threshold for high bandwidth utilization is a value set by a user at runtime. Since the IOPS workloads are CPU sensitive, queue balancing program 112 gathers this information and maps the CPU consumption per I/O queue attached to the overloaded CPU core.

If queue balancing program 112 determines that one or more CPU cores are detected in an overloaded condition and another set of one or more CPU cores are detected underutilized (decision block 312, yes branch), then queue balancing program 112 proceeds to step 406. If queue balancing program 112 determines that one or more CPU cores are not detected in an overloaded condition or that another set of one or more CPU cores are not detected underutilized (decision block 312, no branch), then queue balancing program 112 returns to step 402 to continue monitoring CPU core utilization.

Queue balancing program 112 sends an imbalance message (step 406). In an embodiment, the monitoring daemon sends a signal to the NVMe controller with an imbalance message. In an embodiment, the imbalance message includes the CPU cores that are detected overloaded. In another embodiment, the imbalance message includes the CPU cores that are detected underutilized. In yet another embodiment, the imbalance message includes both the CPU cores that are detected overloaded and the CPU cores that are detected underutilized. In some embodiments, the imbalance message includes the utilization percentage for the cores that are detected overloaded and the cores that are detected underutilized. In an embodiment, the monitoring daemon sends the signal to the NVMe controller using the Admin Submission Queue in the CPU controller management core, such as controller management core 210 from FIG. 2.

Queue balancing program 112 traverses the I/O queues (step 408). In an embodiment, upon reception of a CPU_IMBALANCE message from the monitoring daemon, queue balancing program 112 traverses all the I/O queues connected to the overloaded CPU core and collects the I/O statistics by accessing the data access maps (bandwidth and Input/Output Operations per Second (IOPS) operations) that are maintained by the storage controller.

In an embodiment, queue balancing program 112 examines all the other CPU cores in the storage system and which cores have additional bandwidth. In an embodiment, queue balancing program 112 determines the utilization percentage of all the CPU cores in the storage system to determine which cores are underutilized and can potentially have new I/O queues assigned to them to rebalance the storage system.

Queue balancing program 112 parses all host I/O queues on the overloaded CPU cores (step 410). In an embodiment, queue balancing program 112 parses all the I/O queues for the host that are part of the overloaded CPU cores, and other IOQ information is captured. In an embodiment, queue balancing program 112 uses the IOQ information to determine the available options for overload balancing. In an embodiment, the IOQ information includes the CPU cores that are detected overloaded and the CPU cores that are detected underutilized to determine the available options for overload balancing. In an embodiment, the IOQ information includes the utilization percentage for the cores that are detected overloaded and the cores that are detected underutilized to determine the available options for overload balancing. In yet another embodiment, the IOQ information includes the CPU cores that are detected overloaded and the CPU cores that are detected underutilized along with the utilization percentage for the cores to determine the available options for overload balancing.

Queue balancing program 112 selects a new IOQ that can accept additional workload (step 412). In an embodiment, queue balancing program 112 selects the new IOQ to be recommended for I/O balancing. In an embodiment, queue balancing program 112 selects the new IOQ based on the workload information gathered from each IOQ in step 410. In an embodiment, queue balancing program 112 selects the new IOQ based on the utilization percentage of the CPU core for the new IOQ being less than a threshold. In an embodiment, the predetermined threshold is a system default. In another embodiment, the predetermined threshold is received from a user at runtime. In an embodiment, queue balancing program 112 selects the new IOQ based on symmetric workload balancing of the I/O queue workloads on the storage system. For example, assume Queue A1 and Queue B1 are located on the same CPU core and are generating high workloads. The CPU core associated with the Queues A1 and B1 is overloaded and therefore queue balancing program 112 will check for all the I/O queues created by Host A and Host B. In this example, queue balancing program 112 then classifies these I/O queues for the existing CPU and associated workload. In this example, queue balancing program 112 determines that IOQ A2 and B2, which are resident on core 2, have fewer queues and lower CPU workload, and therefore queue balancing program 112 moves one of the IOQ (either A1 or B1) workloads to core 2.

In an embodiment, queue balancing program 112 selects multiple IOQs that can each be used to rebalance the workload, and prioritizes the IOQs by available workload. In an embodiment, queue balancing program 112 selects the highest priority available IOQ to recommend for IOQ rebalancing. In an embodiment, the highest priority available IOQ is the IOQ that is attached to the CPU core with the lowest utilization. In another embodiment, the highest priority available IOQ is determined by choosing an IOQ attached to a CPU core with no other IOQs attached to that core.

Queue balancing program 112 maps the new IOQ_ID to the NQN (step 414). In an embodiment, queue balancing program 112 uses the IOQ manager to map the new IOQ_ID selected in step 412 to the NQN of the remote storage target, for example, storage system 330 of FIGS. 3a-3c.

Queue balancing program 112 sends an AER to the designated NQN with the IOQ_ID to shift the workload (step 416). In an embodiment, queue balancing program 112 generates an AER message with the suggested new IOQ_ID to the designated NQN to recommend shifting the workload to this IOQ. In an embodiment, once queue balancing program 112 makes the new I/O workload transferring decisions, the information is sent as a signal to the administrative control unit of the NVMe controller. In an embodiment, queue balancing program 112 sends an asynchronous notification of the queue overlap situation to the host either through internal communication or through protocol level communication (via an NVMe Asynchronous Event Request Command). In an embodiment, this message contains the IOQ_ID to which the storage system is expecting to move traffic to balance the CPU workload. Since queue balancing program 112 has already established a new I/O queue with a new IOQ_ID, queue balancing program 112 expects the host to send more traffic on the suggested queue to get more performance and greater parallelism.

In an embodiment, communication between queue balancing program 112 and the host notifier can be through an out-of-band (OOB) protocol, using OOB application program interfaces (APIs) implemented with the capability to communicate between hosts and the storage controller clustered system. For example, in FIG. 3b, signal 342 represents an out of band communication. In another embodiment, communication between queue balancing program 112 and the host notifier can be through in-band communications using NVMe standards. In this embodiment, the queue overlapping information and actuator signals are passed programmatically as part of protocol frames. For example, in FIG. 3b, signal 341 represents an in-band communication.

Queue balancing program 112 receives a response from the host (step 418). In an embodiment, queue balancing program 112 receives a response from the host of the new IOQ that was selected in step 412. In the example of FIG. 3c, the host of the new IOQ is host B 312. In an embodiment, the response may be either the host accepts the recommendation, or the host rejects the recommendation.

Queue balancing program 112 determines if the host accepted the new IOQ_ID (decision block 420). In an embodiment, queue balancing program 112 determines if the host has accepted the recommendation. In an embodiment, once the signal is sent to the host, the host NVMe driver will decide whether to continue with the current I/O sending policy or to adopt the suggestion from queue balancing program 112 for prioritizing a certain IOQ. In an embodiment, if the host decides to adopt the suggestion from queue balancing program 112, then the IOQ pathing policies are tuned by the NVMe driver at the host side to send more traffic on the suggested IOQ_ID to gain more performance. All the new traffic from the server/host will be sent via the newly assigned IOQ_ID which goes to the new CPU core, and the host applications therefore experience increased performance.

In another embodiment, if the hosts can tolerate the performance degradation, the host can tolerate the total decrease in IOPs, or the host does not want to change the IOQ policy for any other reason, then the suggestion is rejected, and a signal is sent to notify queue balancing program 112 of the rejection. In an embodiment, once queue balancing program 112 receives the rejection signal, queue balancing program 112 sends the AER message to another host to shift its I/O workload off the overloaded CPU core. In this way, the queue balancing program and the hosts will both be parties to the decision, and workload balancing will be accomplished gracefully by signaling the second host. For example, if queue A1 and queue B1 are overlapped and queue balancing program 112 determines to balance the workload by shifting the load from queue A1 or queue B 1, then the queue balancing program sends a signal to Host A to use queue A2. If Host A rejects the suggestion, then the queue balancing program sends the signal to Host B to shift the workload to B2. This process repeats until a host accepts the request to change to the new IOQ. This serialization is performed to prevent the situation where changing the preferred IOQs by multiple hosts at the same time results in creating a new imbalance.

If queue balancing program 112 determines that the host has accepted the recommendation (decision block 312, yes branch), then queue balancing program 112 proceeds to step 422. In an embodiment, if queue balancing program 112 determines that the host has not accepted the recommendation (decision block 312, no branch), then queue balancing program 112 returns to step 412 to select a different IOQ. In another embodiment, if queue balancing program 112 determines that the host has not accepted the recommendation (decision block 312, no branch) because the workload is not IOPS sensitive, then queue balancing program 112 ends for this cycle.

Queue balancing program 112 receives an ACK from the host that the IOQ change was ACCEPTED (step 422). In an embodiment, if queue balancing program 112 determines that the host has accepted the recommendation, then queue balancing program changes the host IOQ preference settings to send more workload on the queue with the new IOQ_ID. In an embodiment, queue balancing program 112 receives an ACK signal from the target with an ACCEPTANCE message. This completes the rebalance cycle.

In an embodiment, queue balancing program 112 ends for this cycle.

Figure 5:
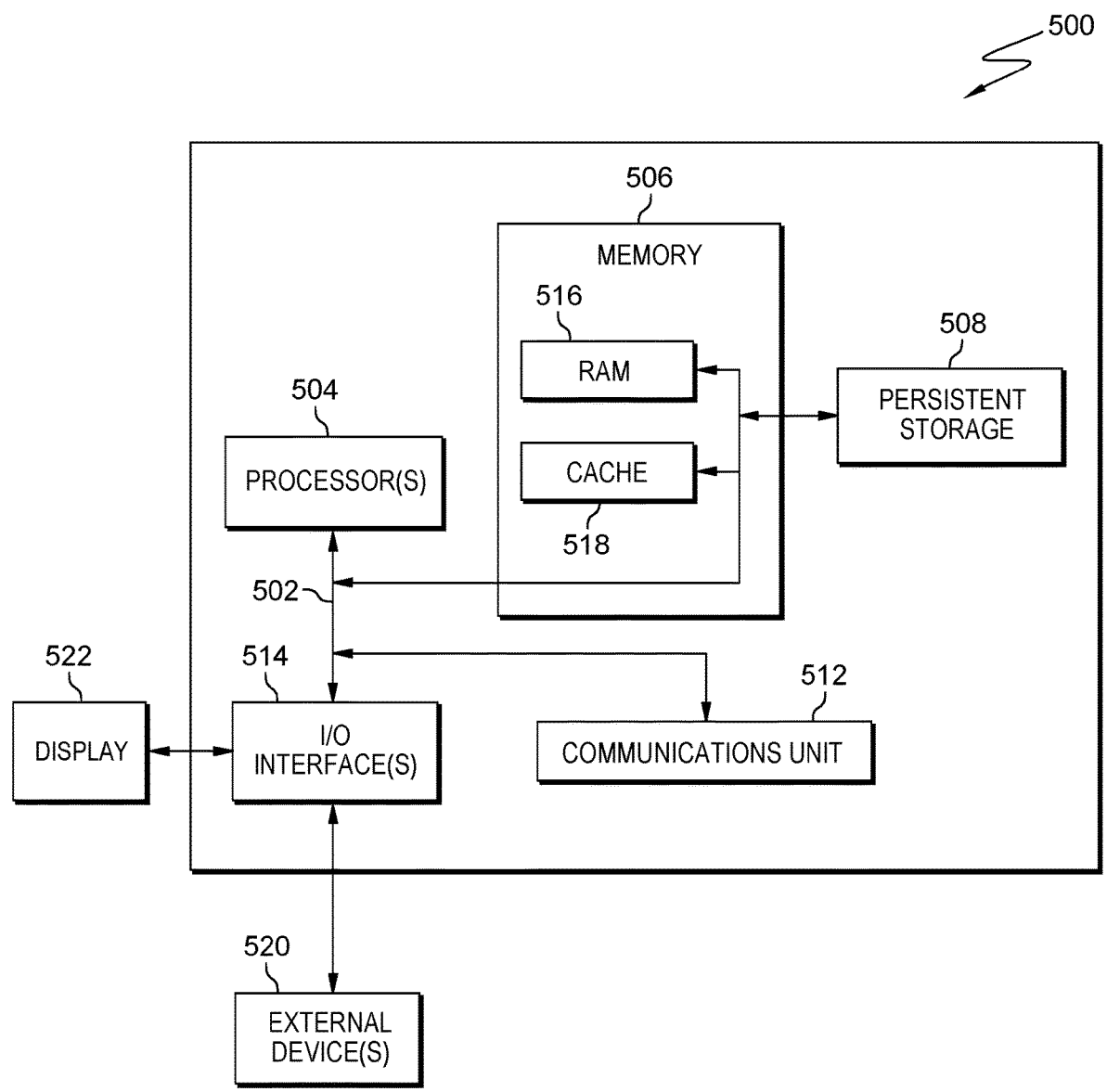
FIG. 5 depicts a block diagram of components of the computing devices executing the queue balancing program within the distributed data processing environment of FIG. 1, in accordance with an embodiment of the present invention.

FIG. 5 is a block diagram depicting components of storage system 110 suitable for queue balancing program 112 in accordance with at least one embodiment of the invention. FIG. 5 displays the computer 500, one or more processor(s) 504 (including one or more computer processors), a communications fabric 502, a memory 506 including, a random-access memory (RAM) 516, and a cache 518, a persistent storage 508, a communications unit 512, I/O interfaces 514, a display 522, and external devices 520. It should be appreciated that FIG. 5 provides only an illustration of one embodiment and does not imply any limitations with regard to the environments in which different embodiments may be implemented. Many modifications to the depicted environment may be made.

As depicted, the computer 500 operates over the communications fabric 502, which provides communications between the computer processor(s) 504, memory 506, persistent storage 508, communications unit 512, and input/output (I/O) interface(s) 514. The communications fabric 502 may be implemented with an architecture suitable for passing data or control information between the processors 504 (e.g., microprocessors, communications processors, and network processors), the memory 506, the external devices 520, and any other hardware components within a system. For example, the communications fabric 502 may be implemented with one or more buses.

The memory 506 and persistent storage 508 are computer readable storage media. In the depicted embodiment, the memory 506 comprises a RAM 516 and a cache 518. In general, the memory 506 can include any suitable volatile or non-volatile computer readable storage media. Cache 518 is a fast memory that enhances the performance of processor(s) 504 by holding recently accessed data, and near recently accessed data, from RAM 516.

Program instructions for queue balancing program 112 may be stored in the persistent storage 508, or more generally, any computer readable storage media, for execution by one or more of the respective computer processors 504 via one or more memories of the memory 506. The persistent storage 508 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

The communications unit 512, in these examples, provides for communications with other data processing systems or devices. In these examples, the communications unit 512 includes one or more network interface cards. The communications unit 512 may provide communications through the use of either or both physical and wireless communications links. In the context of some embodiments of the present invention, the source of the various input data may be physically remote to the computer 500 such that the input data may be received, and the output similarly transmitted via the communications unit 512.

The I/O interface(s) 514 allows for input and output of data with other devices that may be connected to computer 500. For example, the I/O interface(s) 514 may provide a connection to external device(s) 520 such as a keyboard, a keypad, a touch screen, a microphone, a digital camera, and/or some other suitable input device. External device(s) 520 can also include portable computer readable storage media such as, for example, thumb drives, portable optical or magnetic disks, and memory cards. Software and data used to practice embodiments of the present invention, e.g., queue balancing program 112, can be stored on such portable computer readable storage media and can be loaded onto persistent storage 508 via the I/O interface(s) 514. I/O interface(s) 514 also connect to a display 522.

Display 522 provides a mechanism to display data to a user and may be, for example, a computer monitor. Display 522 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for storage level load balancing, the computer-implemented method comprising the steps of:

monitoring, by one or more computer processors, a load level of a storage system, wherein the load level is a utilization percentage of a plurality of CPU cores in the storage system;

detecting, by the one or more computer processors, an overload condition based on the utilization percentage of one or more CPU cores of the plurality of CPU cores exceeds a first threshold, wherein the overload condition is caused by an overlap of one or more I/O queues from each host computer of a plurality of host computers accessing a first CPU core of the plurality of CPU cores in the storage system;

responsive to detecting the overload condition, selecting, by the one or more computer processors, a new I/O queue on a second CPU core of the plurality of CPU cores in the storage system, wherein the second CPU core has the utilization percentage less than a second threshold; and sending, by the one or more computer processors, a recommendation to a first host computer of the plurality of host computers, wherein the recommendation is to move an I/O traffic from the first CPU core to the new I/O queue on the second CPU core to rebalance the load level of the storage system.

2. The computer-implemented method of claim 1, wherein recommending the new I/O queue on the second CPU core to the first host computer of the plurality of host computers to rebalance the load level of the storage system further comprises:

receiving, by the one or more computer processors, a response from the one host computer of the plurality of host computers; and responsive to the response is a rejection of the recommendation, recommending, by the one or more computer processors, the new I/O queue on the second CPU core to a second host computer of the plurality of host computers to rebalance the load level of the storage system.

3. The computer-implemented method of claim 1, wherein monitoring, by the one or more computer processors, the load level of the storage system, wherein the load level is the utilization percentage of the plurality of CPU cores in the storage system further comprises using a daemon to collect the utilization percentage of the one or more CPU cores of the plurality of CPU cores.

4. The computer-implemented method of claim 1, wherein detecting, by the one or more computer processors, the overload condition based on the utilization percentage of one or more CPU cores of the plurality of CPU cores exceeds the first threshold further comprises:

collecting, by the one or more computer processors, a CPU core utilization data contained in a one or more storage system configuration maps and a one or more storage system usage tables, wherein the one or more storage system configuration maps include an I/O queue configuration for each CPU core of the plurality of CPU cores; and analyzing, by the one or more computer processors, the CPU core utilization data collected in the one or more storage system configuration maps and the one or more storage system usage tables to determine the utilization percentage of each I/O queue in each CPU core of the plurality of CPU cores.

5. The computer-implemented method of claim 1, wherein responsive to detecting the overload condition, selecting the new I/O queue on the second CPU core of the plurality of CPU cores in the storage system, wherein the second CPU core has the utilization percentage less than the second threshold further comprises performing symmetric workload balancing of the workload on each I/O queue of the one or more I/O queues on the storage system.

6. A computer program product for storage level load balancing, the computer program product comprising one or more computer readable storage media and program instructions stored on the one or more computer readable storage media, the program instructions including instructions to:

monitor a load level of a storage system, wherein the load level is a utilization percentage of a plurality of CPU cores in the storage system;

detect an overload condition based on the utilization percentage of one or more CPU cores of the plurality of CPU cores exceeds a first threshold, wherein the overload condition is caused by an overlap of one or more I/O queues from each host computer of a plurality of host computers accessing a first CPU core of the plurality of CPU cores in the storage system;

responsive to detecting the overload condition, select a new I/O queue on a second CPU core of the plurality of CPU cores in the storage system, wherein the second CPU core has the utilization percentage less than a second threshold; and send a recommendation to a first host computer of the plurality of host computers, wherein the recommendation is to move an I/O traffic from the first CPU core to the new I/O queue on the second CPU core to rebalance the load level of the storage system.

7. The computer program product of claim 6, wherein recommending the new I/O queue on the second CPU core to the first host computer of the plurality of host computers to rebalance the load level of the storage system further comprises one or more of the following program instructions, stored on the one or more computer readable storage media, to:

receive a response from the one host computer of the plurality of host computers; and responsive to the response is a rejection of the recommendation, recommend the new I/O queue on the second CPU core to a second host computer of the plurality of host computers to rebalance the load level of the storage system.

8. The computer program product of claim 6, wherein monitor the load level of the storage system, wherein the load level is the utilization percentage of the plurality of CPU cores in the storage system further comprises using a daemon to collect the utilization percentage of the one or more CPU cores of the plurality of CPU cores.

9. The computer program product of claim 6, wherein detect the overload condition based on the utilization percentage of one or more CPU cores of the plurality of CPU cores exceeds the first threshold, wherein the overload condition is caused by the overlap of one or more I/O queues from each host computer of a plurality of host computers accessing the first CPU core of the plurality of CPU cores in the storage system further comprises one or more of the following program instructions, stored on the one or more computer readable storage media, to:

collect a CPU core utilization data contained in a one or more storage system configuration maps and a one or more storage system usage tables, wherein the one or more storage system configuration maps include an I/O queue configuration for each CPU core of the plurality of CPU cores; and analyze the CPU core utilization data collected in the one or more storage system configuration maps and the one or more storage system usage tables to determine the utilization percentage of each I/O queue in each CPU core of the plurality of CPU cores.

10. The computer program product of claim 6, wherein responsive to detecting the overload condition, select the new I/O queue on the second CPU core of the plurality of CPU cores in the storage system, wherein the second CPU core has the utilization percentage less than the second threshold further comprises performing symmetric workload balancing of the workload on each I/O queue of the one or more I/O queues on the storage system.

11. A computer system for storage level load balancing, the computer system comprising:
 one or more computer processors;
 one or more computer readable storage media; and
 program instructions stored on the one or more computer readable storage media for execution by at least one of the one or more computer processors, the stored program instructions including instructions to:
 monitor a load level of a storage system, wherein the load level is a utilization percentage of a plurality of CPU cores in the storage system;
 detect an overload condition based on the utilization percentage of one or more CPU cores of the plurality of CPU cores exceeds a first threshold, wherein the overload condition is caused by an overlap of one or more I/O queues from each host computer of a plurality of host computers accessing a first CPU core of the plurality of CPU cores in the storage system;
 responsive to detecting the overload condition, select a new I/O queue on a second CPU core of the plurality of CPU cores in the storage system, wherein the second CPU core has the utilization percentage less than a second threshold; and
 send a recommendation to a first host computer of the plurality of host computers, wherein the recommendation is to move an I/O traffic from the first CPU core to the new I/O queue on the second CPU core to rebalance the load level of the storage system.

12. The computer system of claim 11, wherein send the recommendation to the first host computer of the plurality of host computers, wherein the recommendation is to move an I/O traffic from the first CPU core to the new I/O queue on the second CPU core to rebalance the load level of the storage system further comprises one or more of the following program instructions, stored on the one or more computer readable storage media, to:
 receive a response from the one host computer of the plurality of host computers; and
 responsive to the response is a rejection of the recommendation, recommend the new I/O queue on the second CPU core to a second host computer of the plurality of host computers to rebalance the load level of the storage system.

13. The computer system of claim 11, wherein monitor the load level of the storage system, wherein the load level is the utilization percentage of the plurality of CPU cores in the storage system further comprises using a daemon to collect the utilization percentage of the one or more CPU cores of the plurality of CPU cores.

14. The computer system of claim 11, wherein detect the overload condition based on the utilization percentage of one or more CPU cores of the plurality of CPU cores exceeds the first threshold, wherein the overload condition is caused by the overlap of one or more I/O queues from each host computer of a plurality of host computers accessing the first CPU core of the plurality of CPU cores in the storage system further comprises one or more of the following program instructions, stored on the one or more computer readable storage media, to:
 collect a CPU core utilization data contained in a one or more storage system configuration maps and a one or more storage system usage tables, wherein the one or more storage system configuration maps include an I/O queue configuration for each CPU core of the plurality of CPU cores; and
 analyze the CPU core utilization data collected in the one or more storage system configuration maps and the one or more storage system usage tables to determine the utilization percentage of each I/O queue in each CPU core of the plurality of CPU cores.

15. The computer system of claim 11, responsive to detecting the overload condition, select the new I/O queue on the second CPU core of the plurality of CPU cores in the storage system, wherein the second CPU core has the utilization percentage less than the second threshold further comprises performing symmetric workload balancing of a workload on each I/O queue of the one or more I/O queues on the storage system.

16. A computer-implemented method for storage level load balancing, the computer-implemented method comprising the steps of:
 responsive to receiving a command from a host computer to establish an I/O queue pair, allocating, by one or more computer processors, a processor resources and a memory resources in a storage system, wherein the storage system implements a Non-Volatile Memory Express over Fabrics (NVMe-oF) architecture;
 detecting, by the one or more computer processors, an overload condition on a first CPU core of a plurality of CPU cores in the storage system, wherein the overload condition is an overlap of a plurality of host computers using a same I/O queue pair; and
 responsive to detecting the overload condition, sending, by the one or more computer processors, a recommendation to a first host computer of the plurality of host computers, wherein the recommendation is to move an I/O traffic from the first CPU core to a new I/O queue on a second CPU core of the plurality of CPU cores in the storage system to rebalance a load level of the storage system, wherein the second CPU core of the plurality of CPU cores in the storage system has a utilization percentage less than a second threshold.

17. The computer-implemented method of claim 16, wherein responsive to detecting the overload condition, sending, by the one or more computer processors, the recommendation to the first host computer of the plurality of host computers, wherein the recommendation is to move an I/O traffic from the first CPU core to the new I/O queue on the second CPU core to rebalance the load level of the storage system further comprises:
 receiving, by the one or more computer processors, a response from the one host computer of the plurality of host computers; and
 responsive to the response is a rejection of the recommendation, recommending, by the one or more computer processors, the new I/O queue on the second CPU core to a second host computer of the plurality of host computers to rebalance the load level of the storage system.

18. The computer-implemented method of claim 16, wherein detecting, by the one or more computer processors, the overload condition on the first CPU core of the plurality of CPU cores in the storage system, wherein the overload condition is the overlap of a plurality of host computers using the same I/O queue pair further comprises:
 collecting, by the one or more computer processors, a CPU core utilization data contained in a one or more storage system configuration maps and a one or more storage system usage tables, wherein the one or more storage system configuration maps include an I/O queue configuration for each CPU core of the plurality of CPU cores; and analyzing, by the one or more computer processors, the CPU core utilization data collected in the one or more storage system configuration maps and the one or more storage system usage tables to determine a utilization percentage of each I/O queue in each CPU core of the plurality of CPU cores.

19. The computer-implemented method of claim 18, wherein the overload condition is based on the utilization percentage of one or more CPU cores of the plurality of CPU cores in the storage system exceeds a first threshold.

20. A computer system for storage level load balancing, the computer system comprising:
one or more computer processors;
one or more computer readable storage media; and
program instructions stored on the one or more computer readable storage media for execution by at least one of the one or more computer processors, the stored program instructions including instructions to:
responsive to receiving a command from a host computer to establish an I/O queue pair, allocate a processor resources and a memory resources in a storage system, wherein the storage system implements a Non-Volatile Memory Express over Fabrics (NVMe-oF) architecture;
detect an overload condition on a first CPU core of a plurality of CPU cores in the storage system, wherein the overload condition is an overlap of a plurality of host computers using a same I/O queue pair; and
responsive to detecting the overload condition, send a recommendation to a first host computer of the plurality of host computers, wherein the recommendation is to move an I/O traffic from the first CPU core to a new I/O queue on a second CPU core of the plurality of CPU cores in the storage system to rebalance a load level of the storage system, wherein the second CPU core of the plurality of CPU cores in the storage system has a utilization percentage less than a second threshold.

21. The computer system of claim 20, wherein responsive to detecting the overload condition, send the recommendation to the first host computer of the plurality of host computers, wherein the recommendation is to move an I/O traffic from the first CPU core to the new I/O queue on the second CPU core to rebalance the load level of the storage system further comprises one or more of the following program instructions, stored on the one or more computer readable storage media, to:
receive a response from the one host computer of the plurality of host computers; and
responsive to the response is a rejection of the recommendation, recommend the new I/O queue on the second CPU core to a second host computer of the plurality of host computers to rebalance the load level of the storage system.

22. The computer system of claim 20, wherein detect the overload condition on the first CPU core of a plurality of CPU cores in the storage system, wherein the overload condition is the overlap of a plurality of host computers using the same I/O queue pair further comprises one or more of the following program instructions, stored on the one or more computer readable storage media, to:
collect a CPU core utilization data contained in a one or more storage system configuration maps and a one or more storage system usage tables, wherein the one or more storage system configuration maps include an I/O queue configuration for each CPU core of the plurality of CPU cores; and
analyze the CPU core utilization data collected in the one or more storage system configuration maps and the one or more storage system usage tables to determine a utilization percentage of each I/O queue in each CPU core of the plurality of CPU cores.

23. The computer system of claim 22, wherein the overload condition is based on the utilization percentage of one or more CPU cores of the plurality of CPU cores in the storage system exceeds a first threshold.

* * * * *